Jan. 18, 1949.  W. KASTEN  2,459,652
PRESSURE SEAL
Filed May 10, 1945
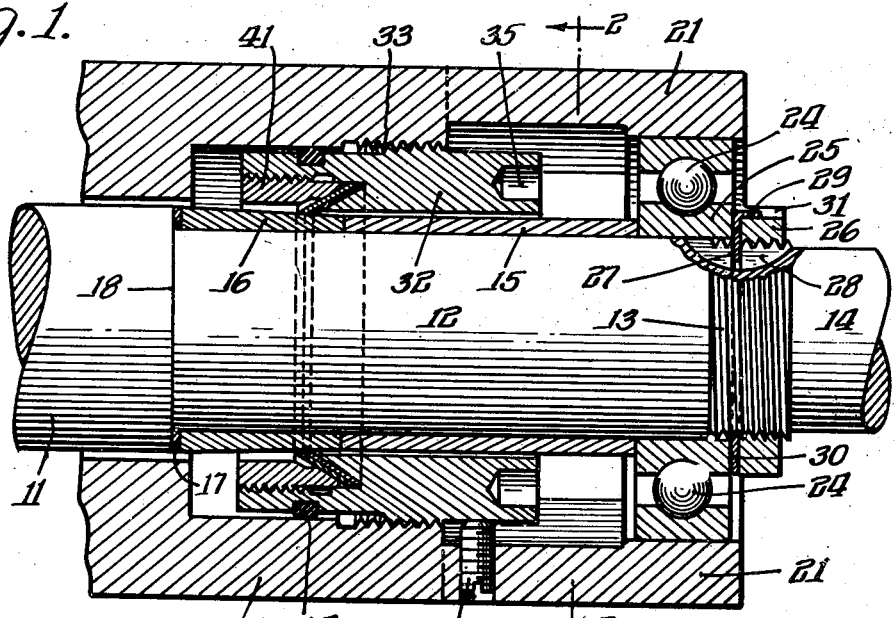
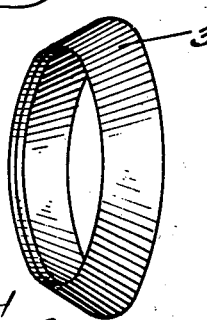
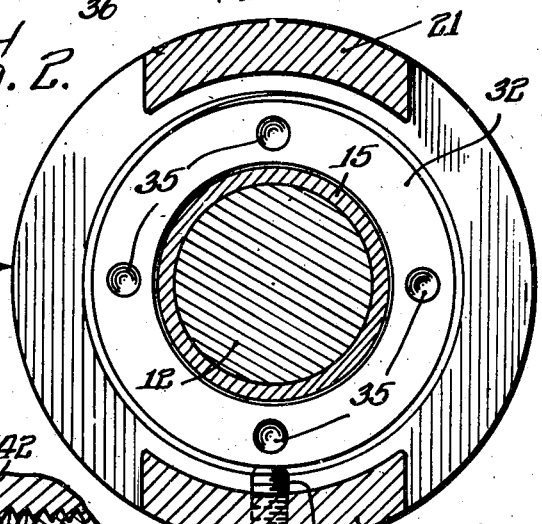
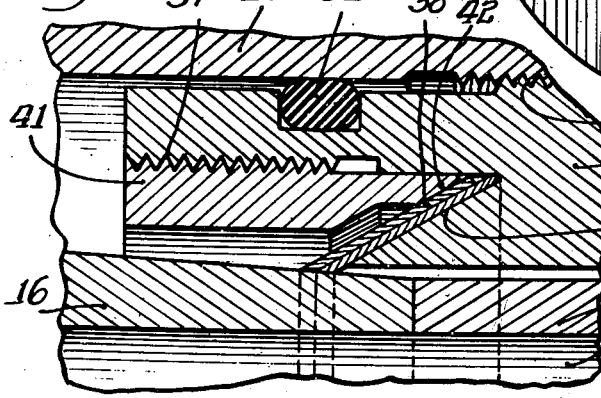
INVENTOR.
Walter Kasten
BY Walter M. Fuller
Atty.

Patented Jan. 18, 1949

2,459,652

UNITED STATES PATENT OFFICE 2,459,652

PRESSURE SEAL

Walter Kasten, Franklin, Mich., assignor to Renniks Company, Detroit, Mich., a copartnership Application May 10, 1945, Serial No. 593,086

1 Claim. (Cl. 286—11.13)

The present invention concerns certain new structural and functional advancements in pressure sealing means for the bearings of appliances in which the shaft or its bearing rotates relatively to the other, one of the principal aims of the invention being to supply a packing or gasket of such improved construction as to confine the pressure to better advantage and more effectively and under greater temperature ranges than has been available heretofore. An added purpose of the invention is to provide a construction of this character which is comparatively simple in structure, which satisfactorily performs its service over a longer period of time, which is constructed to compensate for wear, which is relatively economical to produce, and which is of a self-sealing type.

The accomplishment of these and other objects and purposes of the invention will be readily understood by those acquainted with this art from a consideration of the following description of a present preferred embodiment of the invention illustrated in the accompanying drawing constituting a part of this specification and to which reference should be made, and, for simplicity, like reference numerals have been employed throughout the several views of the drawing to designate the same structural parts.

In such drawing:

Figure 1 is a central, longitudinal section through a bearing equipped with the new pressure sealing structure;

Figure 2 is a cross-section on line 2—2 of Figure 1;

Figure 3 is a perspective view of the metallic reeds of the sealing-means; and

Figure 4 is an enlarged fragmentary portion of Figure 1.

Referring to this drawing, it will be observed that the rotary shaft of a pump, or other comparable appliance, internally operating under fluid pressure, has a cylindrical portion 11, a smaller diameter similar portion 12, screw-threaded at 13, and another adjacent section 14 of still less diameter.

Mounted on the intermediate part 12 of this shaft is the cylindrical sleeve 15 bearing against one end of an adjacent, externally, longitudinally tapered sleeve 16 on the same section of the shaft, the other end of element 16 pressing against a suitable gasket 17 whose opposite face bears against the shaft shoulder 18 at the junction of the parts 11 and 12.

The bearing in which this shaft revolves includes a hollow housing 19 having a pair of oppositely-disposed, transversely-curved, longitudinal arms 21, 21 internally equipped at their outer ends with a ball bearing 24 between themselves and the portion 12 of the shaft which it supports and in which bearing the shaft rotates, one side of the inner ring or race 25 of the ball-bearing pressing against the neighboring end of sleeve 15 in which relation it is maintained by a nut 26 screwed on the threaded part 13 of the shaft and which is normally locked against loosening by an apertured lock-nut disc 30 on the shaft between the parts 25 and 26 and having an inner tongue 27 occupying a slot 28 in the shaft and an external lateral lug 29 in one of a number of annularly-spaced slots 31 in the nut, whereby all of the members of the construction thus far described are maintained properly assembled.

The tapered sleeve 16 is therefore readily removable from the shaft when it becomes unduly worn for replacement by a new sleeve of the same kind, but it should be borne in mind that in some cases the sleeves 15 and 16 may constitute integral parts of the shaft.

The pressure-sealing means comprises an annular member or mounting 32, inside of element 19, surrounding the shaft and longitudinally adjustable lengthwise the shaft by reason of a screw-threaded connection at 33 with the inside of member 19.

A circular channel or groove around the outside of one end portion of the element 32 is occupied by a ring-shaped resilient static seal or gasket 34 of any suitable material depending upon the character of the fluid in the appliance of which the shaft forms a part.

The flat face of member 32 at its outer end has a plurality of annularly spaced-apart recesses 35, 35 adapted to receive the lugs of a spanner-wrench, whereby the position of element 32 may be readily adjusted lengthwise by reason of its screw-threaded mounting 33, such adjusted position of the part 32 being maintained in the usual manner by a set-screw 36.

The opposite end of member 32 has a round internally-screwthreaded cavity 37, housing a metallic reed-means 38, in the present case comprising a plurality of nested or interfitted, thin, resilient, truncated-cone metal-reeds whose inner or smaller ends unitedly bear edgewise on the tapered, external surface of sleeve 16.

As is clearly presented in Figures 1 and 4, the inner end of cavity 37 has an endless, round, slanting shoulder 39 at an angle of about 30° to the axis of the shaft and on and against which shoulder the nested reeds bear, this slope or inclination being provided to cause the nested reeds to press edgewise on the conical-sleeve.

The other ends of the interfitted reeds, as is clearly portrayed in Figure 4, engage the non-screwthreaded portion of the outer wall of cavity 37, the outward parts of the reeds being fixedly held and maintained in position by an externally-screwthreaded sleeve 41, the thread of which coacts with that of cavity 37, such member 41 having a reduced-thickness annular extension with a sloping surface 42 bearing on the outer portion of the reeds to maintain them firmly pressed and held at that location against the inclined, oblique surface of shoulder 39.

Obviously, the fluid pressure in the pump, or other apparatus, with which this novel and improved sealing-means is associated in acting on the un-backedup, inner, terminal portions of the reeds tends to contract them or press them into more firm and intimate contact with the conical-surface sleeve 16, or with the corresponding tapered part of the shaft, if the equivalent of the sleeve is provided as an integral part of the shaft, it being understood that the inner, active edges of the reeds are ordinarily initially finished smooth to a size slightly less than that of the surface which they are to engage when first installed, thereby giving the reeds a suitable pressure on their companion sleeve in their inaugural position.

Assuming that the plurality of reeds have been secured in their mounting, their inner edges are ground down to a diameter of one or more 1000ths of an inch less than the varied diameters of the conical surface which they are to engage, and in a manner so that the stepped-edge feature of such reeds is eliminated.

After this has been done, if desired, these inner edges of the reeds may be lapped on a conical surface like that used on the shaft, such lapping being done with a fine optical-dust, this lapping operation increasing the free diameter of the reeds only about a 1000th of an inch and careful measurements will disclose that the diameter of the toe of the reeds is slightly smaller than the diameter of their heel when measured in their free position.

Thus, the edges of the reeds bearing on the conical surface of the sleeve or shaft, as the case may be, in the slightly-flexed normal relation of the reeds is such that the full width of the edges of the reeds contact with the surface of the sleeve or shaft.

It will be understood, therefore, that after the reeds have been mounted in the bearing and the shaft forced through them, there is an interference fit between the two parts owing to their slightly different diameters, the male part being of minor larger diameter than that of the female part.

The number of reeds to be employed in the gland, whether one or more, is a matter which depends upon the particular conditions of service which the gland must successfully meet, and the angular slope or inclination of the reeds is of importance since it depends in substantial measure on the flexibility of the reeds.

In order to obtain an efficient seal, the gland should ordinarily be as flexible as possible, so that if the pressure happens to be low, the reeds will efficiently seal as well as when the fluid pressure is high, and in this connection it should be borne in mind that if the angle were greater, say up to 60° or more, the cantilever action would be less and require higher pressures to seal.

As to the metal to be used in the reeds, this is a substantial factor in that it should be tough, of adequate tensile-strength, of suitable bearing and wearing properties, and should ordinarily possess high resistance to corrosion. Up to the present time, apparently the best metals for this purpose have been beryllium copper alloy and W. Chase Co. alloy #720, the latter composed of 20% nickel, 20% manganese and 60% copper, the second alloy being preferable.

In order to have a good material with constant tensile-strength and suitable physical properties, it is necessary to control closely and accurately the percentage of beryllium in the beryllium-copper alloy. Since the percentage thereof is quite small and has to be precise, any variation in the alloying of the metal will result in various finished products which in some cases might be unsatisfactory. As contrasted with this, the relatively large percentages of the three ingredients of the nickel-manganese-copper alloy is such that any small variation in the percentage of the different metals which go to make up the alloy does not affect the finished properties materially.

The specified reeds as to thickness would ordinarily individually be somewhere between .005 up to .020 inch, but, of course, such dimension is subject to modification.

When the external fit on the sloping surface of the conical sleeve or shaft becomes worn in service by the engagement of the reeds thereon, or when the reeds themselves become unduly worn, they may be adjusted to cause them to coact with an adjacent larger diameter part of the sleeve or shaft by turning the mounting 32 and its contained reeds by an applied spanner-wrench in two opposite recesses 35, 35, a pair of which are always accessible, such turning of these parts advancing the reeds by reason of the screw-threaded connection 33, but, of course, the set-screw 36 must first be loosened and then tightened again after the proper adjustment of the parts has been completed.

Repeated adjustments of this kind may be resorted to from time to time as conditions require.

The present invention is capable of incorporation in physical forms of various styles and types, in some cases involving reversals, and, accordingly, it is not limited or restricted to the precise and exact details of structures illustrated and described. For instance, the number of elastic, flexible reeds used may vary from one up to several, and, instead of being separate nested elements, they may comprise a plurality of helical convolutions of a single, coiled metallic ribbon.

I claim:

In a pressure-sealing construction for a bearing and a hollow housing and a circular member in said bearing and housing, said housing and circular member being rotatable relative to one another, and thin, flexible, round, pressure-sealing reed-means bearing edgewise on one of said relatively rotatable elements, and means between said housing and circular member mounting said reed-means at an oblique-angle to the axis of the element on which it edgewise bears, whereby fluid-pressure on the obtuse-angle face of said reed-means tends to flex the same into firmer engagement with the element on which it edgewise bears, the novel improvement being that the surface of said element on which said reed-means edgewise bears is tapered longitudinally of the axis of said element, that said reed-means is composed of a plurality of closely nested, truncated cone-shaped, continuous, metal reeds in direct contact with one another, and that said means mounting said reed-means is adjustable lengthwise the axis of the housing in the direction of the larger diameter of said element to compensate for wear.

WALTER KASTEN.

REFERENCES CITED

The following references are of record in the file of this patent:

UNITED STATES PATENTS

| Number | Name | Date |
| --- | --- | --- |
| 1,200,966 | Minning | Oct. 10, 1916 |
| 1,868,199 | Pelterie | July 19, 1932 |
| 1,991,173 | Rautenstrauch | Feb. 12, 1935 |
| 2,226,273 | Westefeldt | Dec. 24, 1940 |
| 2,385,045 | Wallace | Sept. 18, 1945 |

FOREIGN PATENTS

| Number | Country | Date |
| --- | --- | --- |
| 12,183 | Switzerland | 1896 |